US 9,192,265 B1
Nov. 24, 2015

(12) United States Patent
Johnson

(10) Patent No.: US 9,192,265 B1
(45) Date of Patent: Nov. 24, 2015

(54) GREASE COLLECTOR RECEPTACLE AND COOKING UTENSIL FOR USE THEREWITH

(71) Applicant: Jeffrey A. Johnson, Saint Cloud, MN (US)

(72) Inventor: Jeffrey A. Johnson, Saint Cloud, MN (US)

(*) Notice: Subject to any disclaimer, the term of this patent is extended or adjusted under 35 U.S.C. 154(b) by 50 days.

(21) Appl. No.: 14/054,796

(22) Filed: Oct. 15, 2013

Related U.S. Application Data

(60) Provisional application No. 61/714,408, filed on Oct. 16, 2012.

(51) Int. Cl.
    *A47J 36/14* (2006.01)
    *A47J 47/00* (2006.01)
    *A47J 37/12* (2006.01)

(52) U.S. Cl.
    CPC .............. *A47J 47/00* (2013.01); *A47J 37/1285* (2013.01)

(58) Field of Classification Search
    CPC ..... A47J 37/1285; A47J 37/10; A47J 37/108; A47J 47/00; A47J 47/16; A47J 53/285
    USPC ..................... 426/523; 99/444, 425, 422, 495
    See application file for complete search history.

(56) References Cited

U.S. PATENT DOCUMENTS

| | | | |
|---|---|---|---|
| 1,447,813 A | 3/1923 | Patrick | |
| 2,157,303 A | 5/1939 | Penrose et al. | |
| 2,175,333 A | 10/1939 | Wilson | |
| 3,034,419 A | 5/1962 | Hillebrand et al. | |
| 3,719,507 A | 3/1973 | Bardeau | |
| 3,750,560 A | 8/1973 | Holmes | |
| 3,797,377 A | 3/1974 | Lotter et al. | |
| 3,847,068 A | 11/1974 | Beer et al. | |
| 3,964,378 A | 6/1976 | Dunkelman | |
| 4,230,574 A | 10/1980 | Whaley et al. | |
| 4,324,173 A | 4/1982 | Moore et al. | |
| 4,352,324 A | 10/1982 | Noh | |
| 4,420,006 A | 12/1983 | Moore et al. | |
| 4,517,886 A | 5/1985 | Bales | |
| 4,862,791 A | 9/1989 | Baughey | |
| 4,899,649 A | 2/1990 | Grob et al. | |
| 4,974,501 A | 12/1990 | Grob et al. | |
| 5,117,747 A | 6/1992 | Kuechler | |
| 5,467,696 A | 11/1995 | Everhart | |
| 5,576,047 A | 11/1996 | Margolis | |
| 5,584,236 A | 12/1996 | Margolis | |
| 5,617,777 A | 4/1997 | Davis et al. | |
| 5,652,012 A | 7/1997 | Margolis | |

(Continued)

FOREIGN PATENT DOCUMENTS

WO    WO 2005/107543 A2    11/2005

*Primary Examiner* — Steven Leff
(74) *Attorney, Agent, or Firm* — Albert W. Watkins

(57) ABSTRACT

A counter-top grease collector receptacle that is co-operative with a cooking vessel to collect and dispose of cooking fluids and grease. A cover defines a sloped cooking vessel support. A mechanism or wedge may be provided to control the slope angle. A receptacle has an interior that is adapted to operatively receive and contain fluids drained from the cooking vessel. The receptacle is located beneath the cooking vessel support to enable gravity transfer of fluids from cooking vessel to receptacle. An oil drain stem is adapted to operatively removably couple the cooking vessel to the receptacle. The cover is cooperative with the cooking vessel support and receptacle to enclose and conceal the receptacle interior. An auxiliary funnel inlet may also be provided above the receptacle to receive fluids from cooking vessels not otherwise adapted to couple through the oil drain stem.

11 Claims, 5 Drawing Sheets

(56) References Cited

U.S. PATENT DOCUMENTS

| | | |
|---|---|---|
| 5,750,182 A | 5/1998 | Margolis et al. |
| 5,837,310 A | 11/1998 | Margolis et al. |
| 5,850,779 A | 12/1998 | Zimmerman |
| RE36,173 E | 3/1999 | Margolis |
| 5,884,555 A * | 3/1999 | Chang .............................. 99/425 |
| 5,927,142 A | 7/1999 | Mercer |
| 5,942,269 A | 8/1999 | Casey et al. |
| 5,967,024 A | 10/1999 | Demars |
| 6,009,794 A | 1/2000 | Casey et al. |
| 6,085,641 A | 7/2000 | De'Longhi |
| 6,186,054 B1 * | 2/2001 | Hung .............................. 99/339 |
| 6,355,168 B1 | 3/2002 | White |
| 6,367,372 B1 | 4/2002 | Chikazawa et al. |
| 6,368,648 B1 | 4/2002 | Bertram et al. |
| 6,378,420 B1 | 4/2002 | Savage et al. |
| 6,415,710 B1 | 7/2002 | Boone |
| 6,439,110 B1 | 8/2002 | Lin |
| 7,059,318 B2 | 6/2006 | Cornfield |
| 7,137,419 B1 | 11/2006 | Reeves |
| 7,311,038 B2 | 12/2007 | Savage et al. |
| 7,377,210 B1 | 5/2008 | Franco |
| 7,421,942 B2 | 9/2008 | Hansen et al. |
| 7,523,697 B2 | 4/2009 | Hedrington |
| 7,731,846 B1 | 6/2010 | Jones |
| D628,851 S | 12/2010 | Bergne |
| 8,016,150 B1 | 9/2011 | Bunch et al. |
| 2009/0277338 A1 * | 11/2009 | Palmer .............................. 99/425 |
| 2010/0175408 A1 | 7/2010 | Korda |

* cited by examiner

GREASE COLLECTOR RECEPTACLE AND COOKING UTENSIL FOR USE THEREWITH

CROSS REFERENCE TO RELATED APPLICATIONS

This application claims the benefit under 35 USC 119(e) of provisional application 61/714,408 filed on Oct. 16, 2012 and herewith by the same inventor, the contents which are incorporated herein by reference in entirety.

BACKGROUND OF THE INVENTION

1. Field of the Invention

This invention pertains generally to cooking apparatus having drip segregating, receiving or directing with a subjacent receptacle.

2. Description of the Related Art

Throughout the ages, mankind has always required food for sustenance. As may be appreciated then, nearly every person who has walked the earth has had the need for food, and the desire to prepare the food in a safe and yet satisfying way. As may also then be expected, an enormous number of recipes and cooking techniques have evolved. The art of food preparation has progressed from meeting basic needs to an art that can both meet the basic need of sustenance and which can provide great pleasure to the senses. There has been a development of many different cuisines and many different food preparation techniques. Along with many different cuisines and techniques, there has been an equally substantial evolution in the cooking appliances and cookware that are used for the preparation.

During the cooking of many foods, various liquids may typically be released. Usually, the liquid will be a complex mixture of water, grease and other compounds. In addition, various liquids may also be added, such as oils, wine, gravies and many other compositions. As the liquid is released from the cooking food, it may also pick up seasonings or other ingredients that may be present.

The presence or absence of liquid within the cooking vessel will change the way the food cooks, and will also alter the resulting flavors and smells, depending upon a variety of factors, including the cooking temperature, cooking duration, the existence of seasonings or other additives, and so forth. Consequently, a chef will ordinarily want to exert much control over the contents of the cooking vessel, and may wish to vary the amounts of liquid contained therein, even during the cooking of a single food or dish. Once the cooking process is complete, and again depending upon the food or dish prepared, there may also be waste liquid that is generated which will not be served with the food. One common example is the grease-laden residue from the preparation of bacon. This grease is considered to be relatively unhealthy, and it may also carry relatively large quantities of salt and other compounds used to cure the bacon. In many kitchens then, this bacon grease is simply disposed of.

Many persons will dispose of the waste liquids by filling an empty container, such as an empty jar, can, juice concentrate container, or other convenient container. Unfortunately, these containers are almost always of relatively small diameter, meaning the cook must very carefully align the cookware with the small opening of the grease receptacle. Further, the grease will often flow along the edge of the pan, leading to an unpredictable and large area over which the grease will run. This means that more often than not, the cook will only get some portion of the waste cooking liquid into the container, and will spill the rest. In addition, when the liquid is being dispensed when hot, this can cause harm to cooking surfaces and floors, and potentially even to the cook. Any liquid that runs along the outer edge of the pan will need to be removed carefully if the cook is still preparing the dish, since the cookware will be immediately returned to the burner or heat source. Also, owing to the common small diameter and relatively greater height of most of these containers, they are easy to knock over and spill. This is particularly likely to happen when the cooking liquids do run along the outer surface of the cookware, because the natural instinct is to quickly lower the cookware onto the container. The cook may then accidentally knock the container over with the cookware.

A large number of devastating fires originate from accidental spills of oil and grease during food preparation. In addition, many persons are temporarily inconvenienced and, in some instances, seriously harmed while handling cooking fluids and grease.

Recognizing the hazards associated with this old and common way of disposing of waste cooking liquids, various artisans have proposed solutions. One way this problem is diminished is to provide cookware with specially designed pour spouts or surface drains that decrease the likelihood of spills or liquids running along the cookware exterior. Exemplary patents, the teachings and contents which are incorporated herein by reference, include: U.S. Pat. No. 1,447,813 by Patrick, entitled "Frying pan"; U.S. Pat. No. 2,157,303 by Penrose et al, entitled "Draining frying pan"; U.S. Pat. No. 2,175,333 by Wilson, entitled "Grease pan for grills"; U.S. Pat. No. 3,719,507 by Bardeau, entitled "Cooking Appliance"; U.S. Pat. No. 3,797,377 by Lotter et al, entitled "Tiltable Cooking Pan"; U.S. Pat. No. 3,847,068 by Beer et al, entitled "Fatless Frying Pan"; U.S. Pat. No. 3,964,378 by Dunkelman, entitled "Tilting frypan with drain system"; U.S. Pat. No. 4,352,324 by Noh, entitled "Frying pan with a removable grease catcher"; U.S. Pat. No. 5,967,024 by DeMars, entitled "Juice removal frying pan"; and Des 628,851 by Bergne, entitled "Frying pan". While this cookware is a definite improvement over the prior art cookware, the grease receptacles remain a serious issue.

Other artisans have proposed cookware that is open to a drain conduit or other type of bottom drain, that feeds a receptacle. Exemplary patents, the teachings and contents which are incorporated herein by reference, include: U.S. Pat. No. 4,517,886 by Bales, entitled "Grease collection system for range"; U.S. Pat. No. 4,862,791 by Baughey, entitled "Microwave frying system"; U.S. Pat. No. 5,117,747 by Kuechler, entitled "Broiler for meat products and the like"; U.S. Pat. No. 7,059,318 by Cornfield, entitled "Multi-purpose stovetop grilling and cooking device"; and U.S. Pat. No. 7,523,697 by Hedrington, entitled "Tiltable cooking appliance". These types of cookware work very well for the preparation of particular foods using particular techniques, often for foods such as french toast and bacon. However, since the cookware is continuously drained, the chef has no ability to control the liquid level, and instead is limited to relatively dry food preparation of only particular foods.

In a variation of the continuous draining cookware, some artisans have recognized the desirability of allowing the chef control over the timing of the draining of the liquid. One group of these include simple pans or cookware with drain valves. Exemplary patents and published applications, the teachings and contents which are incorporated herein by reference, include: U.S. Pat. No. 3,034,419 by Hillebrand et al, entitled "Combination cooking unit"; U.S. Pat. No. 5,467,696 by Everhart, entitled "Grease free skillet"; U.S. Pat. No. 7,421,942 by Hansen et al, entitled "Grease collection system for oven"; and WO 2005107543 A2 by Crawford et al, entitled "Cooker with latching drip tray for selectively opening and closing grease dispensing apertures in cooking pan".

In a particular variant or extension of this concept, other artisans have proposed the use of tubes coming from a cooking receptacle to guide and funnel the cooking liquid and thereby facilitate the safe and selective draining therefrom. Exemplary patents and published applications, the teachings and contents which are incorporated herein by reference, include: U.S. Pat. No. 5,884,555 by Chang, entitled "Griddle structure"; U.S. Pat. No. 6,085,641 by De'Longhi, entitled "Apparatus for frying food products"; and 2009/0277338 by Palmer, entitled "Cooking pan apparatus and system with integral cooking liquid drain, and method of use".

Other artisans have proposed various improvements to the grease receptacle, providing vastly more safe and effective receptacles. Exemplary patents, the teachings and contents which are incorporated herein by reference, include: U.S. Pat. No. 6,355,168 by White, entitled "Cooking oil storage and filtering system"; U.S. Pat. No. 6,415,710 by Boone, entitled "Grease collection system"; U.S. Pat. No. 7,137,419 by Reeves, entitled "Used cooking oil processing apparatus"; U.S. Pat. No. 7,377,210 by Franco, entitled "Grease receiving and holding system"; U.S. Pat. No. 7,731,846 by Jones, entitled "Grease collection system"; and U.S. Pat. No. 8,016,150 by Bunch et al, entitled "Used cooking grease disposal and storage device". With the notable exception of the Boone patent, these receptacles do not alleviate the deficiencies of pouring the liquid from the cookware, including the running of liquid along the cookware exterior surface. While Boone solves this, the Boone apparatus is undesirably limited to a single type and construction of cookware.

Other patents and published applications that show various liquid draining and handling systems, the teachings and contents which are incorporated herein by reference, include: U.S. Pat. No. 3,750,560 by Holmes, entitled "Deep Fat Fryer"; U.S. Pat. No. 4,230,574 by Whaley et al, entitled "Method for filtering frying oil"; U.S. Pat. No. 4,324,173 by Moore et al, entitled "Filter system for frying apparatus"; U.S. Pat. No. 4,420,006 by Moore et al, entitled "Spray cleaning system for frying apparatus"; U.S. Pat. No. 4,899,649 by Grob et al, entitled "Deep fat frying apparatus having an improved cooking fluid filtration system"; U.S. Pat. No. 4,974,501 by Grob et al, entitled "Deep fat frying apparatus with improved under-fryer cooking liquid pumping and filtration system"; U.S. Pat. No. 5,576,047 by Margolis, entitled "Method to produce a cooked, low fat ground meat product"; U.S. Pat. No. 5,584,236 by Margolis, entitled "Fat removal draining system and method"; U.S. Pat. No. 5,617,777 by Davis et al, entitled "Deep fat frying apparatus with automated oil management"; U.S. Pat. No. 5,652,012 by Margolis, entitled "Method for producing a low fat meat product"; U.S. Pat. No. 5,750,182 by Margolis et al, entitled "Method for producing a low fat meat product"; U.S. Pat. No. 5,837,310 by Margolis et al, entitled "Method to produce a cooked low fat ground meat product"; U.S. Pat. No. 5,942,269 by Casey et al, entitled "Method for manipulating cooking medium during cooking operations"; U.S. Pat. No. 6,009,794 by Casey et al, entitled "Cooking medium management system"; U.S. Pat. No. 6,367,372 by Chikazawa et al, entitled "Valve opening/closing device of a fryer"; U.S. Pat. No. 6,368,648 by Bertram et al, entitled "Adsorbent filtration system for treating used cooking oil or fat in frying operations"; U.S. Pat. No. 6,378,420 by Savage et al, entitled "Filter system for a deep fat fryer"; U.S. Pat. No. 7,311,038 by Savage et al, entitled "Filter system for a deep fat fryer"; Re 36,173 by Margolis, entitled "Method to produce a cooked, low fat ground meat product"; and 2010/0175408 A1 by Korda, entitled "Leak free semi-stackable drain pan".

Other patents for which the teachings and contents are incorporated herein by reference include: U.S. Pat. No. 5,850,779 by Zimmerman, entitled "Pan tilting apparatus"; U.S. Pat. No. 5,927,142 by Mercer, entitled "System and method for determining drain pan fluid level"; and U.S. Pat. No. 6,439,110 by Lin, entitled "Frying pan". In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a counter-top grease collector receptacle that is co-operative with a cooking vessel to provide a convenient, safe and more effective way of collecting and disposing of cooking fluids and grease. A receptacle has an interior that is adapted to operatively receive and contain fluids drained from the cooking vessel. An oil drain stem is adapted to operatively removably couple the cooking vessel to the receptacle. A cover defines a cooking vessel support and is cooperative with the cooking vessel support and receptacle to enclose and conceal the receptacle interior. The receptacle is located beneath the cooking vessel support to enable gravity transfer of fluids from cooking vessel to receptacle. In further manifestations, a valve may be provided in the oil drain stem, and the oil drain stem may be located adjacent to a bottom of the cooking vessel. A sloped surface may be provided for the cooking vessel to rest upon, and a mechanism or wedge may be provided to control the angle. Two or more posts may extend substantially vertically against which the cooking vessel will rest. The posts may either be fixed, or may be provided with spring arms scissoring the posts such that posts can be spread apart and nestle the cooking vessel when the vessel is coupled with the grease collector receptacle. The posts or ledge may further optionally be provided with a plurality of barbs or other feature to help to retain and secure the cooking vessel against vertical movement when in contact with the posts or vertical ledge. A disposable liner may be provided that withstands hot oils within receptacle. An auxiliary funnel inlet may also be provided above the receptacle.

In a second manifestation, the invention is, in combination, a cooking vessel and a grease collector receptacle. The cooking vessel has a fluid drain stem, and the counter-top grease collector receptacle has a cooking fluid receptacle and an oil drain stem inlet for receiving cooking fluid from the cooking vessel into the cooking fluid receptacle.

In a third manifestation, the invention is a method of safely and conveniently draining a cooking vessel. According to the method, a food is inserted into the cooking vessel. Heat is applied to the cooking vessel over a cooking burner and responsive thereto, liquid is released from the food. The cooking vessel is removed from the cooking burner, and then coupled from an interior of the cooking vessel through an oil drain stem to an interior of a counter-top grease collector, while simultaneously resting the cooking vessel upon an exterior of the counter-top grease collector. Released liquid is then allowed to drain through the oil drain stem before the cooking vessel is removed.

OBJECTS OF THE INVENTION

Exemplary embodiments of the present invention solve inadequacies of the prior art by providing a counter-top grease collector receptacle that is co-operative with a variety of cooking apparatus to provide a convenient, safe and more effective way of collecting and disposing of cooking fluids and grease.

A first object of the invention is to enable a cooking vessel to be safely and selectively drained of liquids. A second object of the invention is to provide a receptacle for such drained liquids that is safe and secure upon a counter-top or other work surface. Another object of the present invention is to provide a waste receptacle that conceals the waste liquids and yet which is safely and easily emptied. A further object of the invention is to enable a cook to view the level of waste liquid held therein, while not otherwise exposing the waste liquid to view. Yet another object of the present invention is to provide the foregoing in a counter-top grease collector receptacle that is simple to construct, intuitive to use, and which can be readily fashionably decorated.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a counter-top grease collector receptacle that is co-operative with a variety of cooking apparatus to provide a convenient, safe and more effective way of collecting and disposing of cooking fluids and grease. In a preferred embodiment of the invention illustrated in FIG. 1, a most preferred cooking vessel 40, such as a fry pan or cooking pot, is operatively engaged with a preferred counter-top grease collector receptacle 5. An oil drain stem 22 is provided to couple between cooking vessel 40 and counter-top grease collector receptacle 5. While oil drain stem 22 could be located at any desired position, the stem preferably passes through a side wall of cooking vessel 40. This allows cooking vessel 40 to be tilted for improved liquid drainage, without risking spilling the liquid from cooking vessel 40 when first placing cooking vessel 40 onto counter-top grease collector receptacle 5. Oil drain stem 22 may be provided as a part of cooking vessel 40, such as illustrate and incorporated herein above by reference in US patents and published applications U.S. Pat. No. 5,884,555 by Chang; U.S. Pat. No. 6,085,641 by De'Longhi; and 2009/0277338 by Palmer.

In an alternative embodiment, oil drain stem 22 can be provided as a part of counter-top grease collector receptacle 5. Oil drain stem 22 will preferably pass through or alternatively define an inlet into grease collector receptacle 5. In this alternative, cooking vessel 40 will preferably include a valve or other suitable fitting or closure to which oil drain stem 22 can easily be coupled. A variety of cookware with valves are incorporated herein above by reference in US patents and published applications U.S. Pat. No. 3,034,419 by Hillebrand et al; U.S. Pat. No. 5,467,696 by Everhart; U.S. Pat. No. 7,421,942 by Hansen et; and WO 2005107543 by Crawford et al. While these aforementioned patents are considered exemplary, other suitable valves are known in the more general art of valves, and such knowledge is further considered incorporated herein for the teachings of alternative valves and couplings that may be used for the coupling between grease collector receptacle 5 and cooking vessel 40. Most preferably, oil drain stem 22 will also preferably engage with so-equipped cooking vessels 40, and where a valve or drain stem is provided thereon, most preferably the valve or drain stem will open as a result of the engagement. While many such techniques will become apparent after a reading of the present disclosure, for exemplary purposes only and not limiting the present invention solely thereto, a spring-loaded or resilient flap valve and seal may be provided at the vessel drain. When inserted into the oil drain stem inlet, a centrally protruding wire or equivalent may press against the flap valve, overcoming the spring or resilient forces, to thereby open the flap valve to allow the vessel contents to drain.

Figure 1:
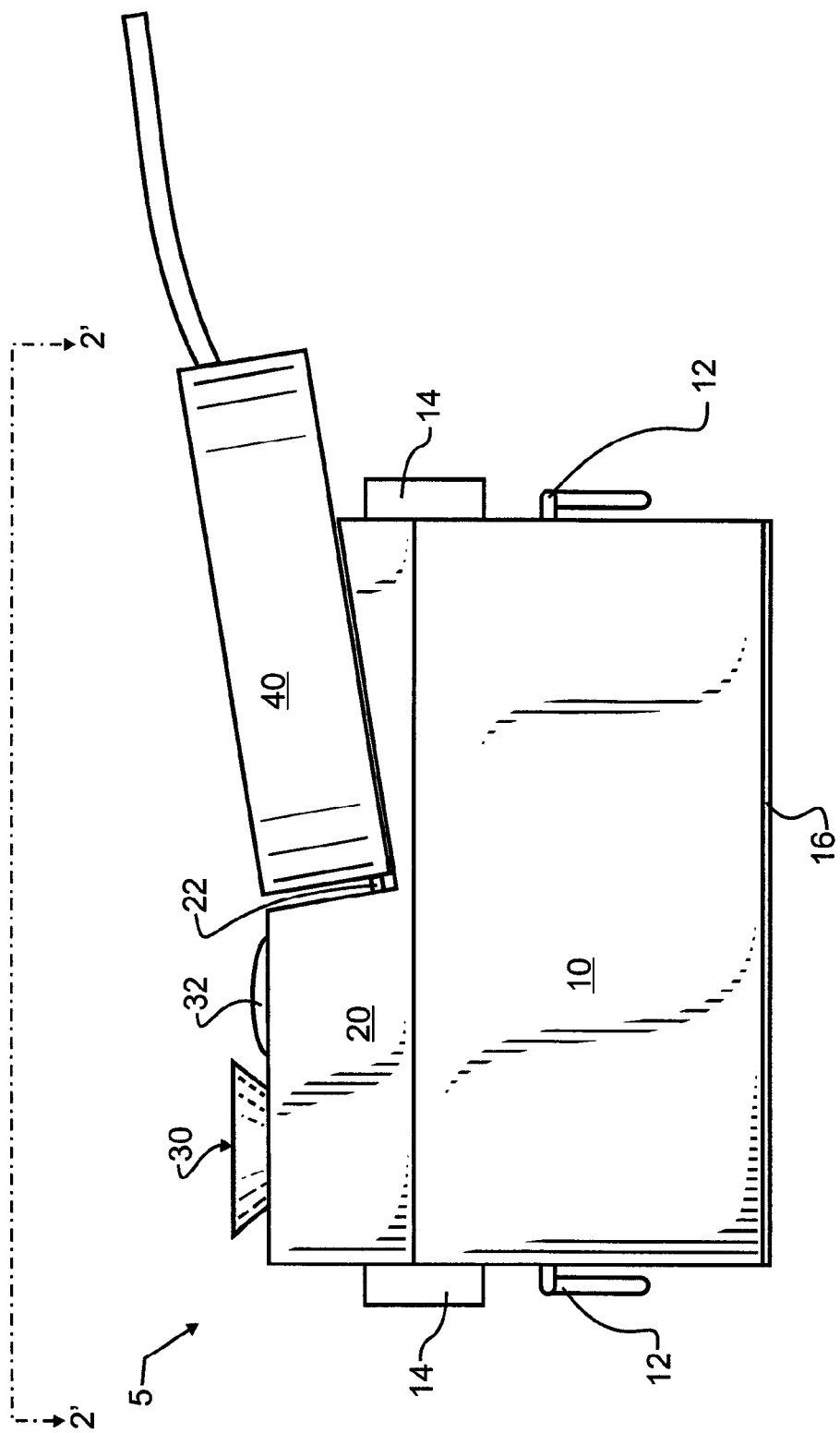
FIG. 1 illustrates a preferred embodiment counter-top grease collector receptacle designed in accord with the teachings of the present invention in combination with a preferred cooking vessel from a side elevational view.
Figure 2:
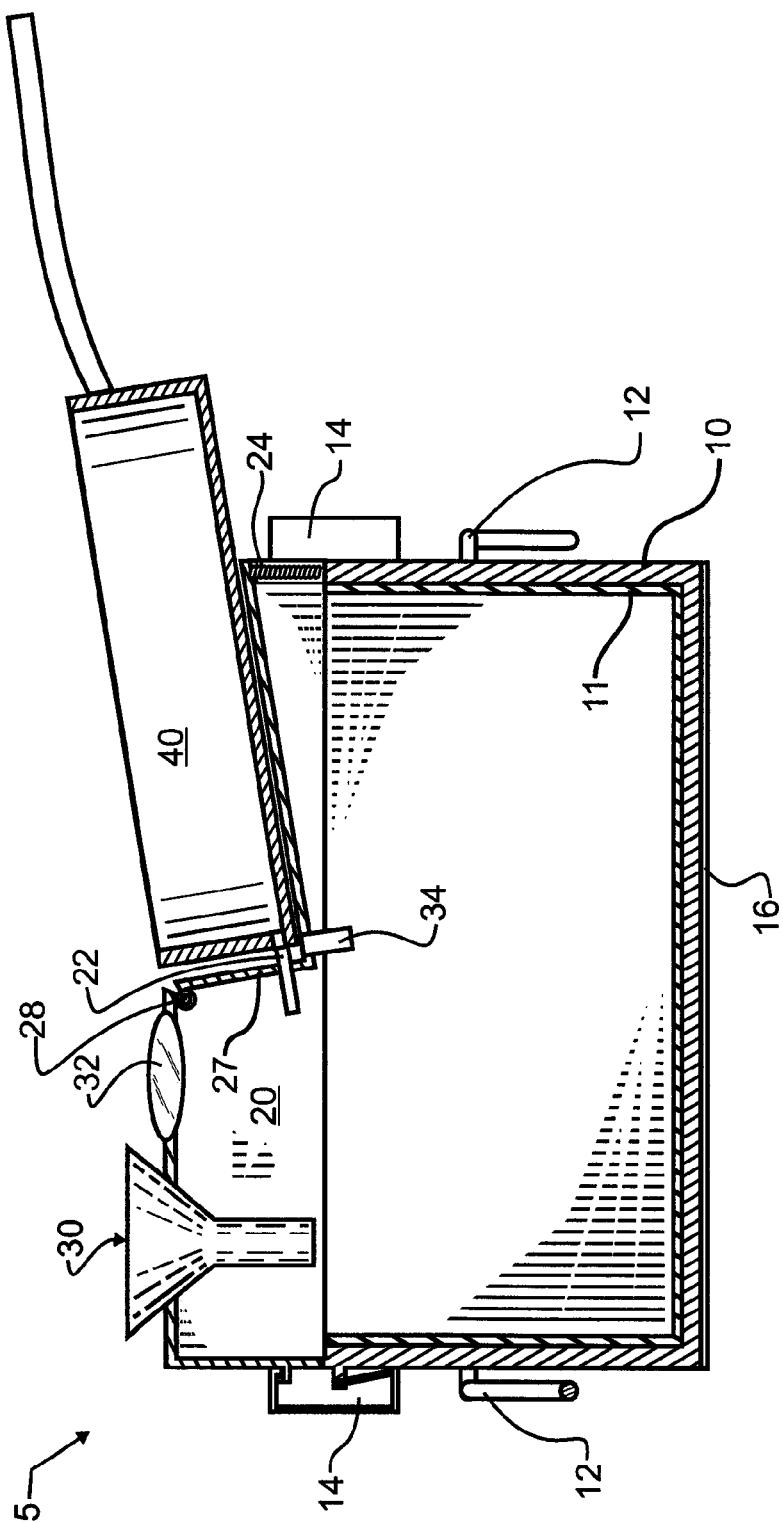
FIG. 2 illustrates the preferred embodiment counter-top grease collector receptacle in combination with the preferred cooking vessel of FIG. 1 from a vertical plane sectional view taken along line 2' of FIG. 1.
Figure 3:
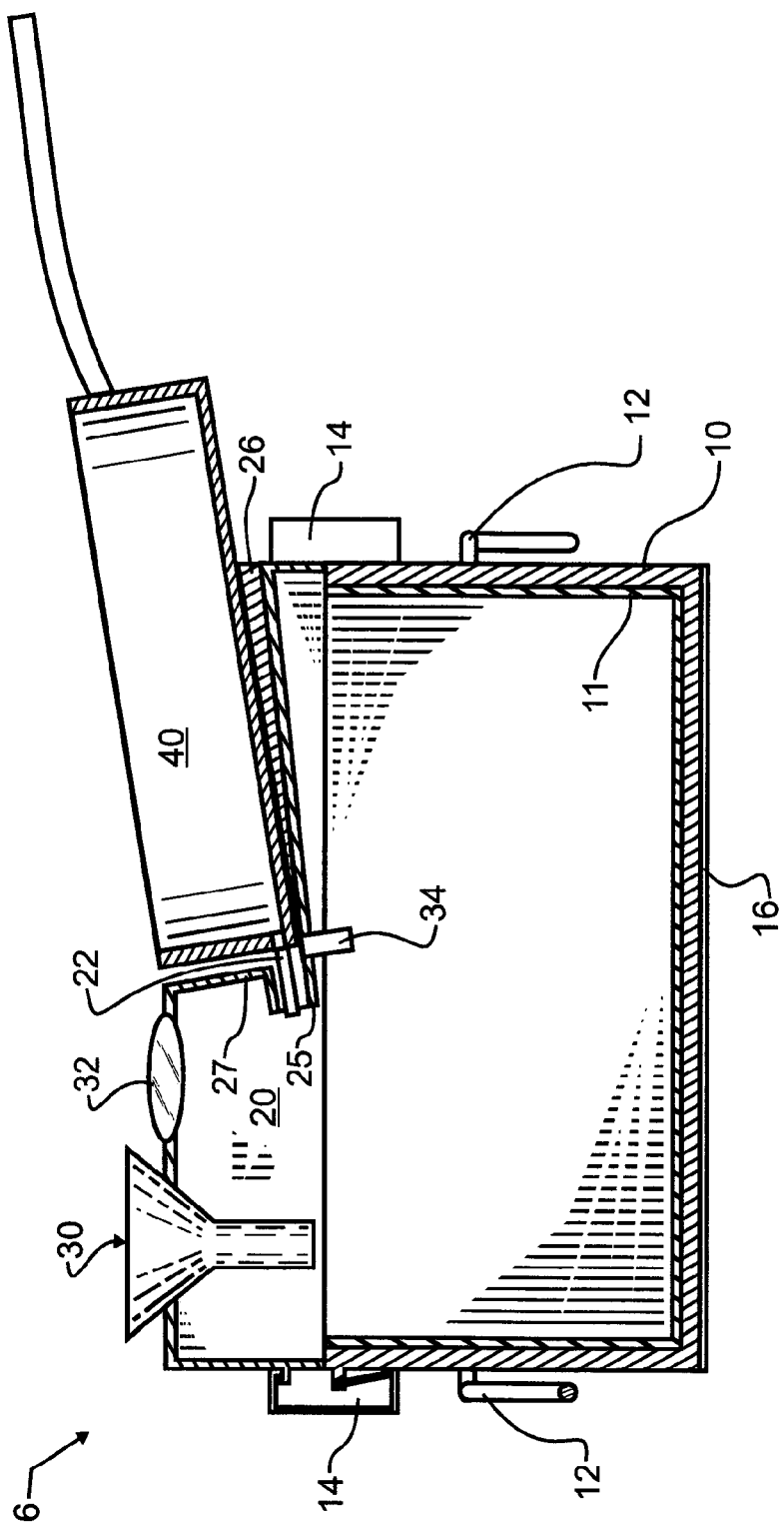
FIG. 3 illustrates an alternative embodiment counter-top grease collector receptacle in combination with a preferred cooking vessel from a vertical plane sectional view similar to that of FIG. 2.

As illustrated in FIGS. 1-3, oil drain stem 22 is located adjacent to the bottom of cooking vessel 40. This allows the most complete draining of cooking vessel 40. Nevertheless, and as is apparent, without other structure and if oil drain stem 22 is simply an open tube, then liquids within cooking vessel 40 will undesirably drain during cooking. Consequently, to locate oil drain stem 22 adjacent to the bottom of cooking vessel 40, oil drain stem 22 will preferably have incorporated therein a valve which can be actuated either manually or preferably through engagement with the receptacle. Alternatively, or in further combination with a valve, a sufficient height differential between the outlet from the valve and the bottom of cooking vessel 40 will allow a cook to move cooking vessel 40 into engagement with grease collector receptacle 5 without spilling or splashing hot cooking fluids. This height differential might for exemplary purposes take the form of a tea pot pour spout or the like.

Alternatively, oil drain stem 22 might comprise a flexible tube such as illustrated in U.S. Pat. No. 5,884,555 by Chang and U.S. Pat. No. 6,085,641 by De'Longhi incorporated by reference herein above. In such case, the stem might be deformed by the cook to elevate during cooking, and lower for grease removal.

In a further alternative, oil drain stem 22 may also be provided as a separate component. As may be apparent then, the present invention offers much flexibility in the coupling and engagement with both prior art cookware and cookware specifically designed to cooperate with grease collector receptacle 5.

In the preferred embodiment, where a coupling occurs between oil drain stem 22, grease collector receptacle 5 and cooking vessel 40, this coupling at least to some degree further serves to assist in retaining or securing cooking vessel 40 to grease collector receptacle 5. This aids in the safe use of the present invention, since accidental bumping or disturbing of a cooking vessel 40 resting upon counter-top grease collector receptacle 5 will normally not result in hazardous spills.

To better facilitate draining of cooking vessel 40, a sloped surface may be provided for the cooking vessel to rest upon. In the preferred embodiment, the particular mechanism to control the angle is not critical to the operation of the present invention, and so may incorporate any of the myriad of apparatus found in the art of joints, supports and couplers. For exemplary purposes only, and not limiting the present invention thereto, one or a few strategically placed vertical-axis screws or bolts 24 are used to tilt cooking vessel 40 relative to underlying counter-top grease collector receptacle 5. Such screws 24 are contemplated herein to be adjustable and may for exemplary purposes be similar in construction and operation to the well-known leveling bolts found under refrigerators and other large appliances. A hinge 28 may also be provided, to allow vertical ledge 27 to move with adjustment of screws 24.

In an alternative embodiment counter-top grease collector receptacle 6 illustrated in FIG. 3, a wedge 26 provides a way to increase or control the slope of a pan or other cooking vessel 40 resting on counter-top grease collector receptacle 6.

Figure 4:
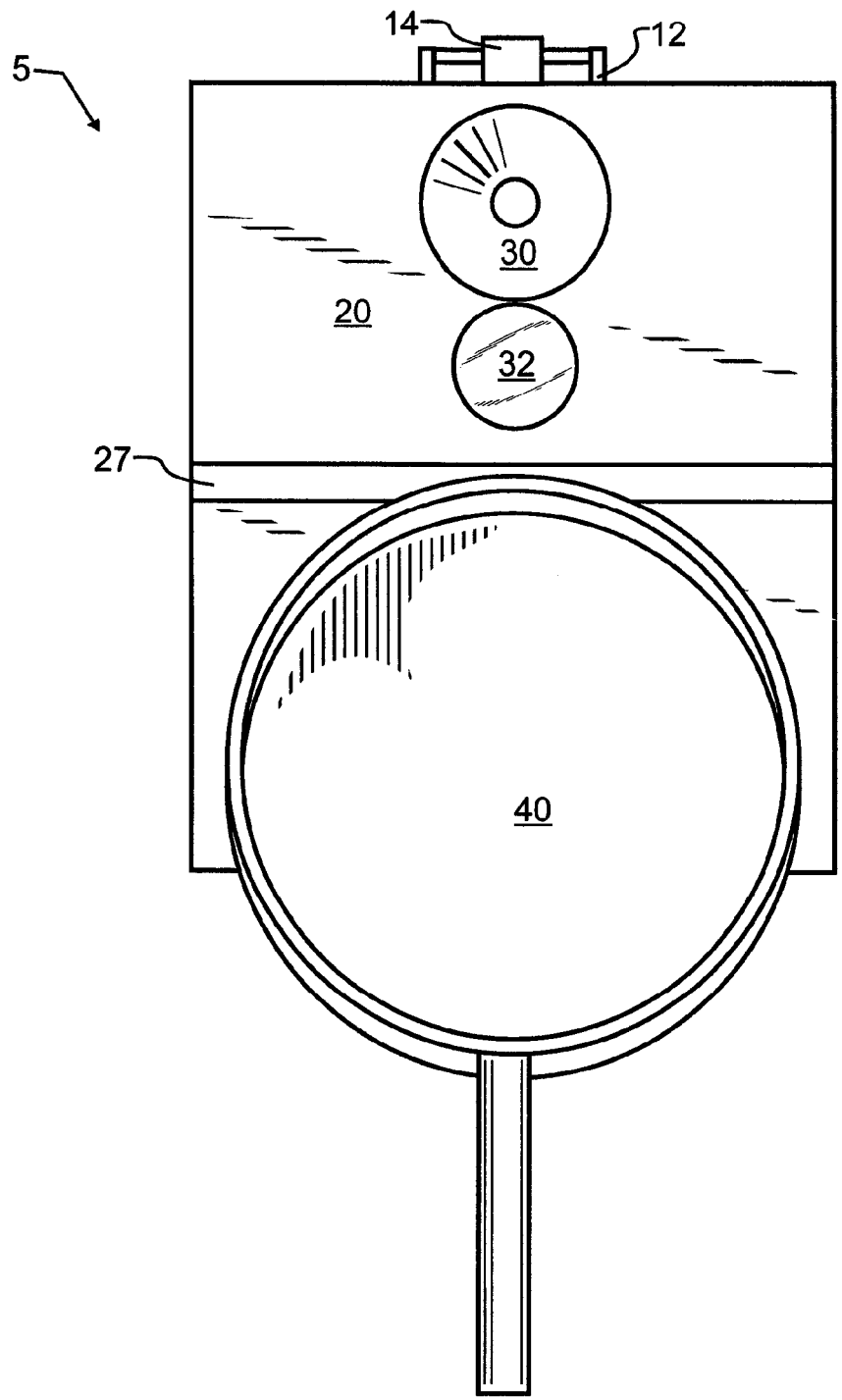
FIG. 4 illustrates the preferred embodiment counter-top grease collector receptacle in combination with the preferred cooking vessel of FIG. 1 from a top plan view.
Figures 5, 6:
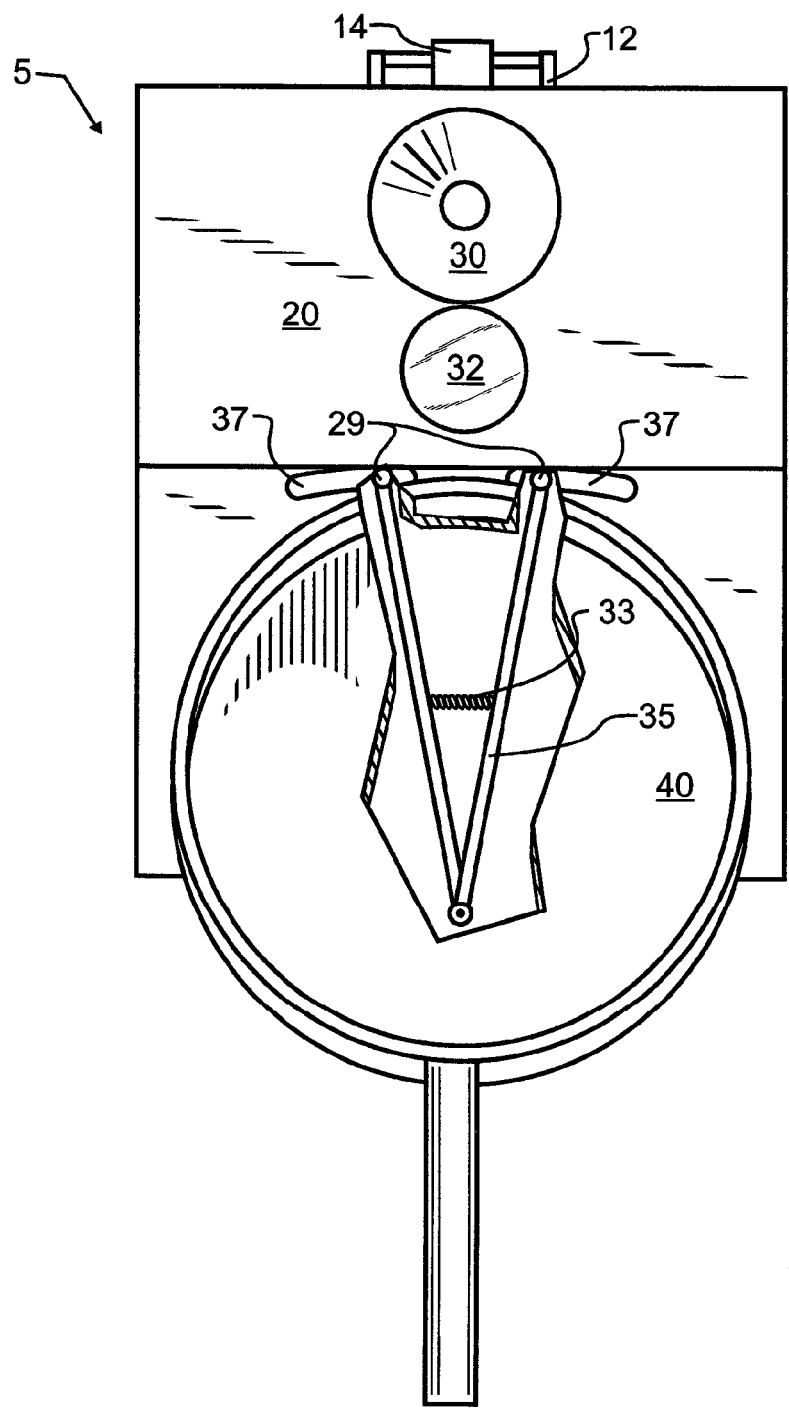
FIG. 5 illustrates an alternative embodiment counter-top grease collector receptacle in combination with a preferred cooking vessel from a from a partially sectioned top plan view.
FIG. 6 illustrates a preferred post used in the alternative embodiment counter-top grease collector receptacle of FIG. 5 from an enlarged side view.

As visible in the Figures, cooking vessel 40 may preferably rest against a substantially vertical ledge 27 that serves as a stop into which cooking vessel 40 may nest or rest. This vertical ledge 27 may be a straight ledge as illustrated in FIGS. 2 and 4, or may in an alternative embodiment be a continuous ledge having a gentle arc or large diameter radius when viewed from a top view. In another alternative embodiment illustrated in FIG. 5, vertical ledge 27 may be replaced by two or more posts 29 that extend substantially vertically against which cooking vessel 40 will rest. The provision of a plurality of posts 29 helps to ensure that, regardless of the diameter of cooking vessel 40, the cooking vessel nestles securely therein. Posts 29 may either be fixed, or may be provided with arms 35 scissoring through spring 33 such that posts 29 can be spread apart within slots 37 and nestle cooking vessel 40 when the vessel is coupled with grease collector receptacle 5.

These posts or ledge may further optionally be provided with a plurality of "fish scales" or "shingles", barbs, a sawtooth surface, or other feature 31 to help to retain and secure the cooking vessel against vertical movement when in contact with the posts 29 or vertical ledge 27. In addition, where vertical ledge 27 is used, it may have a slight undercut 25 adjacent to oil drain stem 22, such that oil drain stem 22 will slip under this slight undercut 25. Once again, by providing this undercut ledge, or a suitable strap over oil drain stem 22 in the case of posts 29, cooking vessel 40 may be further secured against accidental dislodging from counter-top grease collector receptacles 5, 6. As is apparent, any other suitable means may be provided to secure or fasten cooking vessel 40 to counter-top grease collector receptacles 5, 6 as may be desired.

Beneath cooking vessel 40 is a receptacle 10 that receives and contains fluids drained from cooking vessel 40. The exact shape and geometry of receptacle 10 is not critical to proper operation of the invention, though receptacle 10 will preferably be of sufficient capacity to receive at least the contents of one cooking vessel, and preferably from many cooking vessels. By sufficiently sizing receptacle 10, oil and grease can be collected for some time prior to requiring receptacle 10 to be emptied. By allowing for adequate storage capacity, hot cooking fluids may be allowed to stand and cool, and in some cases even congeal or solidify, depending upon the fluid. While not separately illustrated, it will be understood that a filter may be provided between an outlet from oil drain stem 22 and receptacle 10, and may take any suitable geometry. Suitable filters are illustrated in the patents incorporated herein above and are also known in the art generally.

A disposable liner 11 that withstands hot oils is preferably provided, to receive the cooking fluid hot from cooking vessel 40. Disposable liner 11 may be fabricated from a thin film of heat-resistant plastic capable of withstanding relatively high temperatures such as may be achieved during cooking, which at times may approach or even exceed 400 degrees Fahrenheit. In this case, the hot cooking fluids may be allowed to cool in the counter-top grease collector receptacle, and then the bag may be closed such as with a knot, bag tie or the like to prevent accidental release of the waste fluid. The fluid may then be disposed of by closing disposable liner 11 and removing disposable liner 11 from receptacle 10. In this way, handling and clean-up is minimized, and a sanitary receptacle 10 is maintained simply by placing a new disposable liner 11 therein.

In an alternative embodiment, disposable liner 11 may comprise a treated material such as a paperboard, cardboard, or other fibrous, heat-resistant material. The treatment may be an ordinary plastic such as is commonly used in paper and paperboard manufacture, or may alternatively comprise a high temperature filler and bonding agent including but not limited to clay, silica, various thermosetting resins and glues, and other suitable materials. The purpose of the treatment is to remove or greatly reduce any porosity in the fibrous material. The fibers provide structural integrity even when exposed to temperatures higher than will be found in cooking fluids, while the treatment ensures a fluid holding capacity with minimal or no seepage there through. With the structural integrity provided by the fibrous material such as paper or paperboard, a filler such as plastic or resin that softens at or below the temperature of hot cooking fluids will still prevent fluid seepage. The fibers will maintain structural integrity even if the plastic softens. Where paperboard or the like is used as a liner, it is further contemplated herein that there also be provided a mating cover that can close and most preferably reasonably seal disposable liner 11 in preparation for disposal. Other suitable heat resistant materials may also be used to fabricate disposable liner 11, including aluminum foil for exemplary purposes, and the present invention is not solely limited to individual particular materials.

Latches 14 prevent lid 20 from separating from receptacle 10 accidentally or unintentionally, but allow lid 20 to be intentionally removed. In an alternative embodiment, receptacle 10 may comprise a pull-out drawer rather than an open-topped box. In such case, latches 14 may be unnecessary.

As is apparent from the Figures, lid 20 may preferably contain various other apparatus, such as sight glass 32, oil drain stem 22, oil level stem 34, auxiliary funnel 30, and wedge 26. While a sight glass 32 and oil level stem 34 each illustrate optional methods for detecting or observing waste oil levels within receptacle 10, any suitable technique for signaling or alarming a cook of levels is contemplated herein.

With lid 20 removed, disposable liner 11 is readily accessible. Once waste fluid is cooled, disposable liner 11 may be safely removed and disposed of through recycling, including re-purposing such as for production of bio-diesel or the like, or appropriate waste disposal.

The preferred embodiment counter-top grease collector receptacle provides several ways of receiving cooking fluids and grease, to accommodate the wide assortment of cooking vessels found in most kitchens. In consideration thereof, the preferred embodiment counter-top grease receptacle comprises an auxiliary funnel 30 inlet above receptacle 10, but displaced horizontally from wedge 26 and vertical ledge 27. Funnel 30 will preferably be of sufficient size and geometry to readily receive fluids from cooking vessels that are not equipped with drains or valves. These cooking vessels instead must be manually held and tilted to drain the fluids. Funnel 30 as illustrated in the Figures is a basic funnel. However, it will be understood herein that any suitable funnel structure or geometry may be used, including geometries that reduce the potential for splash or geometries that are molded or formed directly into lid 20.

Oil level stem 34 for revealing oil level is also preferably provided, and again may take many forms. This stem may adjacent the exterior of the receptacle, but in the preferred embodiment is more centrally located in the vicinity of oil drain stem 22. This location allows a cook to view the level prior to draining a cooking vessel 40 and subsequent thereto, without having to look in a different place or direction. To further facilitate viewing the level, a sight glass 32 or the like may be provided that can also facilitate viewing of oil drain stem 22.

To further enhance the safety of grease collector receptacles 5, 6, grease collector receptacles 5, 6 will preferably have sufficient mass to stay put upon a counter-top or the like. To further hold grease collector receptacles 5, 6 in place, the base 16 may be coated with non-slip coatings or materials, or may be provided with feet having a strong non-slip characteristic.

For aesthetic purposes, a plurality of diverse coverings, wrappers, or skins may be provided in conjunction with the preferred and alternative embodiment grease collector receptacles, such that one basic model grease collector receptacle may be manufactured, for exemplary purposes in a most common and preferred finish such as stainless steel, chrome plate, or white. To match a grease collector receptacle 5, 6 to a particular kitchen or to provide designer touches, a wrap designed to wrap the grease collector receptacle vertical side walls may then have a different color, pattern or finish. The wrap may be a simple rectangular strip, terminated at each end with mating fasteners such as Velcro™, magnets or any of the other diverse suitable fasteners. Cut-outs may be provided in the wrap to avoid interference with the latches and carrying handles, and any other obstacles.

Since in many instances a grease collector receptacle will need to be moved about, at least on occasion, carrying handles 12 or the equivalent are provided in the preferred embodiment. These carrying handles 12 should not be used when waste fluids are hot, but do allow a person to move a grease collector receptacle 5, 6 about while avoiding contact with the receptacle 10, and with less chance of losing grasp and dropping the grease collector receptacle.

In accord with a preferred method of safely and conveniently cooking with cooking vessel 40, including draining cooking vessel 40, a chef will insert a food into cooking vessel 40. The chef will then apply heat to cooking vessel 40 over a suitable cooking burner, which may include an electric burner, a gas burner, or any other suitable heat source. Responsive to the heating, liquid will be released from the food which will typically include water, juices, and grease. Next, cooking vessel 40 will be removed from the cooking burner, and then be coupled from an interior of cooking vessel 40 through oil drain stem 22 to interior 10 of counter-top grease collector 5, while simultaneously resting cooking vessel 40 upon cover 20 of counter-top grease collector 5. The released liquid is then allowed to drain through oil drain stem 22. The cooking vessel may then be returned to the cooking burner, or alternatively cleaned or otherwise used or handled.

From the foregoing figures and description, several additional features and options become more apparent. First of all, a preferred grease collector receptacle 5, 6 in accord may be manufactured in accord with the teachings of the present invention from a variety of materials, including but not limited to wood, metals, resins and plastics, ceramics or cementitious materials, or even laminates, combinations or composites of the above. The specific material used may vary, though special benefits are attainable if several important factors are taken into consideration. First, the materials will preferably withstand both temperature and oils and liquids associated with cooking fluids. Furthermore, it is preferable that all materials are sufficiently tough and durable to not fracture, even when great forces are applied thereto, to prevent accidental spillage of the contents.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A counter-top grease collector receptacle that is co-operative with a cooking vessel to provide a convenient, safe and more effective way of collecting and disposing of cooking fluids and grease, comprising:
   a receptacle having an interior that is adapted to operatively receive and contain fluids drained from said cooking vessel;
   an oil drain stem adapted to operatively removably couple said cooking vessel to said receptacle;
   a cover defining a cooking vessel support and cooperative with said cooking vessel support and said receptacle to enclose and conceal said receptacle interior, said receptacle located beneath said cooking vessel support to operatively enable gravity transfer of said fluids from said cooking vessel to said receptacle;
   at least two posts that extend substantially vertically from said cover, against which said cooking vessel will operatively rest; and
   spring arms scissoring said at least two posts, wherein said at least two posts are adapted to be operatively spread apart and nestle said cooking vessel when said vessel is coupled with said grease collector receptacle.

2. The counter-top grease collector receptacle of claim 1, wherein said oil drain stem further comprises a valve adapted to operatively control the flow of fluid through said oil drain stem.

3. The counter-top grease collector receptacle of claim 1, wherein said oil drain stem is located adjacent to a bottom of said cooking vessel.

4. The counter-top grease collector receptacle of claim 1, wherein said cooking vessel support further comprises a sloped surface operative to facilitate fluid drain from said cooking vessel.

5. The counter-top grease collector receptacle of claim 4, wherein said sloped surface defines a slope angle, further comprising an angle adjuster.

6. The counter-top grease collector receptacle of claim 5, wherein said angle adjuster further comprises a wedge.

7. The counter-top grease collector receptacle of claim 1, wherein said cover further comprises a support rising generally vertically from said cover and having a plurality of barbs adapted to operatively improve the retention and securing of said cooking vessel to said cover and against vertical movement when in contact therewith.

8. The counter-top grease collector receptacle of claim 1, further comprising a vertical ledge having an undercut adjacent to said oil drain stem, such that said oil drain stem will operatively slip under said undercut.

9. The counter-top grease collector receptacle of claim 1, further comprising a disposable liner within said receptacle that is adapted to operatively withstand hot oils.

10. The counter-top grease collector receptacle of claim 1, further comprising an auxiliary funnel having an inlet above receptacle and having an outlet into said receptacle interior and adapted to operatively receive fluids from cooking vessels and transmit said cooking fluids into said receptacle interior.

11. The counter-top grease collector receptacle of claim 1, further comprising a covering for an exterior of said grease collector receptacles and operative to customize an appearance of said grease collector receptacle.

* * * * *